(12) United States Patent
Hoffeld

(10) Patent No.: US 8,904,775 B2
(45) Date of Patent: Dec. 9, 2014

(54) CLOSURE WITH THERMAL SAFETY FUNCTION FOR A HYDRODYNAMIC MACHINE

(75) Inventor: Harald Hoffeld, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 1005 days.

(21) Appl. No.: 12/737,307

(22) PCT Filed: May 30, 2009

(86) PCT No.: PCT/EP2009/003895
§ 371 (c)(1),
(2), (4) Date: Apr. 18, 2011

(87) PCT Pub. No.: WO2010/003485
PCT Pub. Date: Jan. 14, 2010

(65) Prior Publication Data
US 2011/0185718 A1 Aug. 4, 2011

(30) Foreign Application Priority Data
Jul. 8, 2008 (DE) .......................... 10 2008 031 905

(51) Int. Cl.
*F16D 33/18* (2006.01)
*F16D 9/02* (2006.01)

(52) U.S. Cl.
CPC . *F16D 33/18* (2013.01); *F16D 9/02* (2013.01)
USPC ......................................................... 60/337

(58) Field of Classification Search
USPC .................................. 60/330, 337; 137/72, 74
See application file for complete search history.

(56) References Cited

U.S. PATENT DOCUMENTS

| | | | |
|---|---|---|---|
| 47,076 A | 3/1865 | Smith | |
| 2,216,351 A * | 10/1940 | Miller | ........................ 122/504.3 |
| 3,377,957 A | 4/1968 | Bilton | |
| 3,399,352 A | 8/1968 | Dalton | |

(Continued)

FOREIGN PATENT DOCUMENTS

| | | |
|---|---|---|
| DE | 2009 194 A1 | 9/1970 |
| DE | 30 02 804 C2 | 7/1981 |

(Continued)

OTHER PUBLICATIONS

Chinese Office Action dated Aug. 20, 2013 for Chinese Patent Application 200980126469.7.

*Primary Examiner* — Michael Leslie
(74) *Attorney, Agent, or Firm* — Farjami & Farjami LLP

(57) ABSTRACT

The invention relates to a closure with a thermal safety function for a hydrodynamic or hydraulic machine, in particular a hydrodynamic clutch, designed for use in a housing of the hydrodynamic or hydraulic machine which holds a working medium, wherein the closure has a closure body for screwing or inserting into the housing or mounting on the housing in some other way; the closure body has a passage into which a closure core is introduced, which closure core is connected, by means of a melting element which can be melted on at a predefined temperature, directly to the closure body or to an intermediate element introduced in a seal-forming fashion in the closure body, in such a way that the passage is sealed off so as to prevent the working medium from passing through. The invention is characterized in such a way that the closure core has a blind bore or a blind hole which is open with respect to the working space, with the result that working medium can flow into the closure core.

20 Claims, 3 Drawing Sheets

(56) References Cited

U.S. PATENT DOCUMENTS

Figure 1:
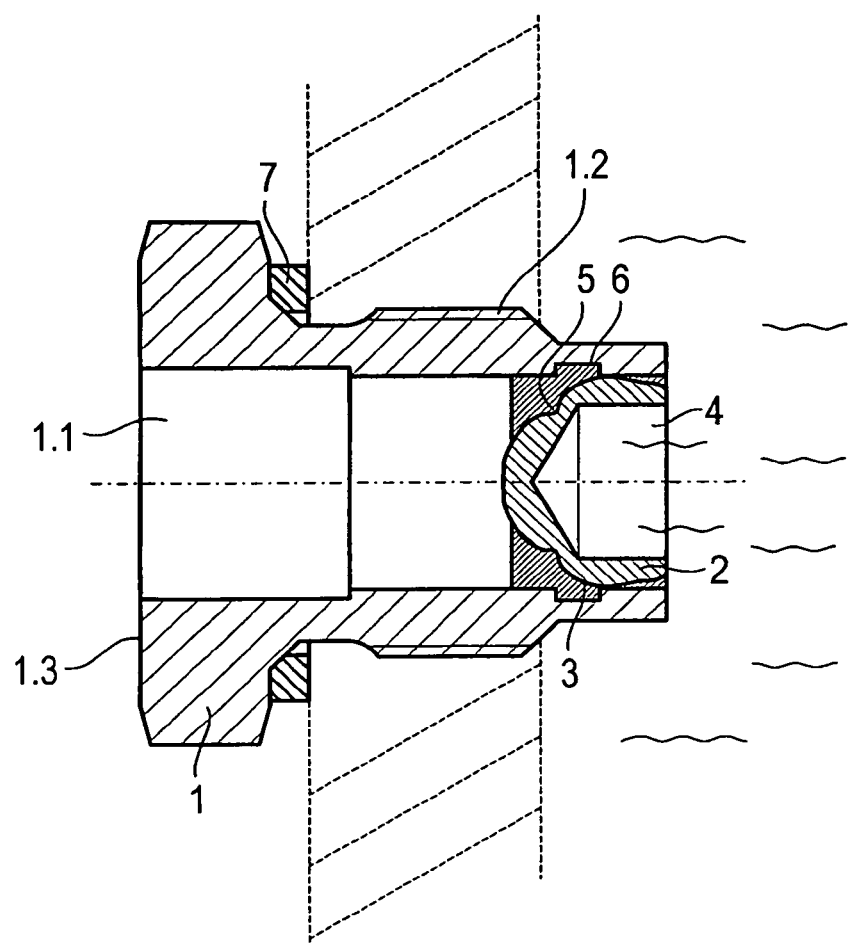

| | | |
|---|---|---|
| 3,436,916 A | 4/1969 | Becker |
| 3,927,791 A | 12/1975 | Hershberger |
| 4,581,892 A * | 4/1986 | Ahrens et al. .................. 60/330 |
| 4,744,382 A | 5/1988 | Visnic |
| 5,251,441 A * | 10/1993 | Eon et al. ........................ 60/330 |
| 5,398,794 A | 3/1995 | Walberg |
| 5,791,367 A | 8/1998 | Hackman |
| 6,866,507 B2 | 3/2005 | Beerstecher |
| 2004/0159349 A1 | 8/2004 | Keefer |
| 2007/0251228 A1 * | 11/2007 | Frank et al. .................... 60/330 |

FOREIGN PATENT DOCUMENTS

| | | |
|---|---|---|
| DE | 103 61 440 A1 | 7/2005 |
| DE | 103 61 453 B3 | 9/2005 |
| EP | 1 557 557 A2 | 9/2005 |
| EP | 1 577 577 A2 | 9/2005 |

* cited by examiner ary great axial length. Due to increasingly higher requirements set to hydrodynamic machines it would be desirable moreover, if the reaction time of the thermal safety function could still be shortened, since then higher temperatures of the working medium are admissible in the hydrodynamic machine, because corresponding temperature overshoot is prevented.

CLOSURE WITH THERMAL SAFETY FUNCTION FOR A HYDRODYNAMIC MACHINE

This is a U.S. national phase application which is based on, and claims priority from, PCT application Serial No. PCT/EP2009/003895, filed May 30, 2009, which claims priority from foreign application Serial No. 102008031905.8, filed Jul. 8, 2008, in Germany.

The invention concerns a closure with thermal safety function for a hydrodynamic machine, for instance for a hydrodynamic clutch, a hydrodynamic converter or a hydrodynamic brake (retarder). Moreover, the closure with thermal safety function can also be used with other hydraulic machines for power transmission purposes, for instance with a so-called visco clutch.

Hydrodynamic or hydraulic machines of the type above mentioned comprise a housing which contains a working medium. The working medium enables to transmit the drive power respectively the torque from a primary wheel to a secondary wheel hydrodynamically or, in the case of a visco clutch, via shear forces in the working medium. Clutches comprise a rotating primary wheel as well as a rotating secondary wheel. In the case of a hydrodynamic retarder, the secondary wheel can be arranged as a stator or rotate opposite to the primary wheel.

Different closures with thermal safety function for hydrodynamic machines are already known. For that purpose, it may be referred to the following documents in particular:

DE 103 61 453 B3
DE 103 61 440 A1
EP 1 577 577 A2
U.S. Pat. No. 5,398,794 A
U.S. Pat. No. 3,399,352 A
U.S. Pat. No. 3,436,916 A

The three first mentioned documents focus explicitly on the reduction of the reaction time of the closure, in order to open quickly a sufficient outlet cross-section in the case of a sudden temperature rise of the working medium of the hydrodynamic machine, via which the working medium can flow out of the work space of the hydrodynamic machine and hence prevent any damage to the hydrodynamic machine by overheating.

Documents DE 103 61 440 A1 and EP 1 577 577 A2 suggest to that end to install an insulation between the closure body and the melting element which can be melted on, for accelerated heating up of the melting element. Document DE 103 61 453 B3, whose features are summed up in the preamble of the comprise claim 1, suggests to install a closure core or a bolt in a passage of the closure respectively of an intermediate element, which is inserted into the closure body and to connect the closure core respectively the bolt by means of a melting element which can be melted on, to the closure body respectively to the intermediate element, so that the passage is sealed off so as to prevent the working medium from passing through. The bolt hence is either in the form of a solid cylinder or in the form of a hollow cylinder, whose front face is closed and is subjected to the working medium over its whole surface. For fast heating up of the bolt (closure core), said bolt protrudes in axial direction from the closure body, so that it is also washed around with working medium along its external circumference and hence creates an intimate heat-transmitting connection with the working medium.

Although the closure with thermal safety function recompriseed in document DE 103 61 453 B3 already enables an extremely fast reaction of the thermal safety function due to its special structure, it comprises the disadvantage of a relatively great axial length. Due to increasingly higher requirements set to hydrodynamic machines it would be desirable moreover, if the reaction time of the thermal safety function could still be shortened, since then higher temperatures of the working medium are admissible in the hydrodynamic machine, because corresponding temperature overshoot is prevented.

From construction of containers overpressure valves are known, which should for instance discharge a gas before causing an explosion. For that purpose, document U.S. Pat. No. 5,791,367 A describes an overpressure valve which closes a gas tank by means of a closure core in a screw. The closure core may comprise an opening which is open to the surrounding atmosphere or is filled with a material with different thermal conductivity. Corresponding valves fitted with a continuous bore, which is covered by a burst disc, are described in documents U.S. Pat. No. 4,744,382 A and U.S. Pat. No. 6,866,507 B1. Additional closures are described in documents U.S. Pat. No. 3,927,791 A, U.S. Pat. No. 47,076 A and DE 20 09 194 A.

The object of the comprise invention is to improve a closure with thermal safety function of the type above mentioned with respect to an ideal construction as well as its reaction time.

The object of the invention is solved by a closure with thermal safety function exhibiting the features of claim 1. Advantageous and particularly appropriate embodiments of the invention are disclosed in the dependent claims.

The closure with thermal safety function for a hydrodynamic or hydraulic machine according to the invention, as described by way of example at the beginning, in particular for a hydrodynamic clutch, is designed in such a way that it can be inserted into a housing of the hydrodynamic respectively hydraulic machine, and more precisely in such a way that it provides a flow-guiding connection with the working medium contained in the housing respectively on its end facing the inside of the housing—at present designated as front or inner end—is washed around by the working medium.

The closure comprises a closure body which can be mounted on or in the housing. For instance, the closure body can be screwed into the housing or inserted otherwise.

The closure body includes a passage, in which a closure core is introduced, which is connected by means of a melting element, which can be melted on at a predefined temperature, directly to the closure body or to an intermediate element introduced in a seal-forming fashion in the closure body in such a way that the passage is sealed off so as to prevent the working medium from passing through the housing respectively to prevent the working medium from leaking from the housing. Hence, the closure core can be soldered directly in the closure body by means of the melting element which can be melted on, in particular in the form of a melting solder, or be connected otherwise in particular adhesively bonded, e.g. by polymerisation, or for instance be soldered in a bushing or be connected otherwise by adhesive bonding therewith, which is inserted sealingly in the closure body.

According to the invention, the closure core comprises a blind bore, in particular with an circular cross-section, or another blind hole closed at one end. The blind bore respectively the blind hole comprise an open end, which is open with respect to the working space, so that the working medium can flow into the closure core. The inflow of the working medium into the closure core creates a particularly large surface for heat transmission from the working medium into the closure core, in particular when the blind bore respectively the blind hole extends almost over the whole axial length of the closure core, that is to say that only a relatively thin bottom remains in the hollow closure core. Alternately or additionally, the wall thickness of the circumference of the hollow closure core can be thin, to form a corresponding thin-walled hollow body with low heat capacity. The quick heating up of the closure core enables rapid fusion of the melting element between the closure core and the intermediate element respectively between the closure core and the closure body.

It is particularly advantageous, that the closure core consists of a massive, in particular cast material, which comprises the blind bore respectively the blind hole by shape cutting. As regards the material of the closure core, it may hence be made up of a homogeneous body.

The closure core may for instance comprise a spherical form on its outer face.

Advantageous, the closure core may comprise such a reduced outer diameter with respect to the inner diameter of the passage in which it is inserted, so as to prevent any jamming of the closure core in the passage after fusion of the melting element, when the closure core moves in axial direction through the passage. In particular, the outer diameter is reduced in such a way that when tilting the closure inside the passage no jamming is caused between closure core and closure respectively between closure core and intermediate element.

The closure core advantageously comprises on its outer face a bottleneck filled with the melting element. It is hereby possible to connect the melting element reliably to the closure core by adhesive bonding.

The melting element can in particular be encompassed over its whole axial length between the closure core and the closure body respectively between the closure core and the intermediate element. With such an embodiment, the melting element has consequently a ring shape, in particular a circular ring shape having a through hole, in which the closure core is inserted in a seal-forming fashion.

The closure body may comprise a protuberance or a recess, which is filled partially or completely with the melting element, to provide a positive connection between closure body and melting element. When providing an intermediate element it is obviously possible to fit the intermediate element with a recess filled accordingly with the melting element.

Said recess is in particular in the form of a circumferential notch, which in particular is arranged at a distance from both axial ends of the passage. Copper in particular can be taken into consideration as a material for the closure core. The closure body may for instance consist of CuZn39Pb3F43, or of 11SMN30+C. Other materials are however possible.

The invention will now be described by way of example using an embodiment and the appended figure.

FIG. 1 illustrates a closure according to the invention, which is inserted in the housing of a hydrodynamic machine and is subjected to the working medium on its axial front end, which penetrates into the inside of the housing. The housing of the hydrodynamic machine is only referred to in dotted lines, the working medium by undulated lines.

Figure 2:
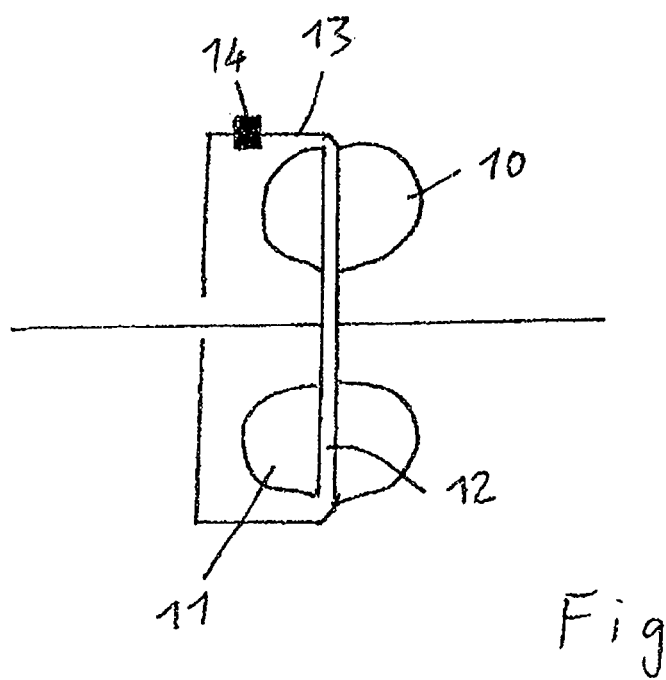

FIG. 2 illustrates a hydrodynamic machine with a rotating primary wheel 10 and a rotating or stationary secondary wheel 11 forming together a working space 12 and a housing 13 in which the closure with a thermal safety function 14 is inserted.

Figure 3:
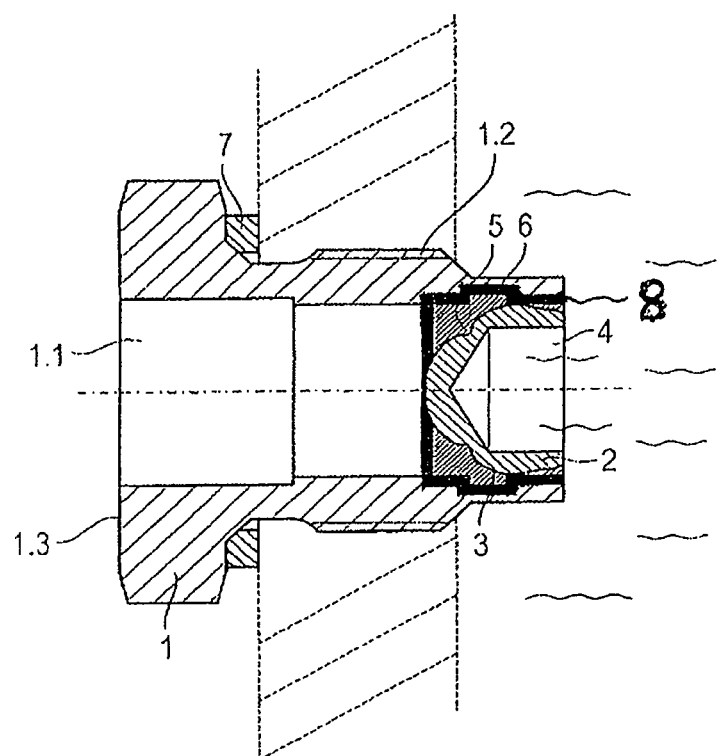

FIG. 3 illustrates the machine shown in FIG. 1 with the addition of an intermediate element 8 inserted in between the melting element 3 and the closure body 1.

The closure comprises a closure body 1 which carries a thread 1.2, by means of which it is screwed into the housing. The closure body 1 is moreover sealed off against the housing by means of a seal 7. The seal 7 is a compression seal, that is to say it presently comprises a circumferential groove, which is compressed by the axial compression when mounted, as recompriseed, so that both front faces which delineate the groove and which are spaced apart from one another when the compression seal is unstressed, contact each other.

The closure body 1 moreover comprises a head 1.3, which for instance can be designed as an external hexagon, to be able to screw the closure body 1 into the housing. It goes without saying that other contact surfaces can be used for a screwing tool on the closure body 1 respectively its head 1.3, for instance for an Allen key or similar.

The closure body 1 accommodates a passage 1.1, which extends through the whole closure body 1 in axial direction and is at present designed in a stepped fashion, which means that it comprises different axial sections connecting against one another and having differing inner diameters relative to one another. It goes without saying that the passage can also be designed cylindrically with constant diameter.

A closure core 2 is introduced into the passage 1.1. Presently, the closure core 2 is inserted in such a way in the front axial end extending into the inside of the housing, that it ends up flush with the front face of the closure body 1. The closure core 2 is fastened to the closure body 1 by means of a melting element 3. When designing the melting element 3 as a melting solder, the closure core 2 is soldered into the closure body 1.

Although it is non recompriseed, the closure core 2 could also be fastened by means of the melting element in an intermediate element 8, which is then inserted sealingly in the closure body 1.

The melting element 3 melts above a predefined temperature, for example above a temperature of 60° C. or 70° C. and thus releases the connection between the closure body 1 (or an intermediate element 8) and the closure core 2. Hereby, the closure core 2 may move inside the passage 1.1 respectively, come out of the closure body 1, so that the passage 1.1 is released for working medium, which then may flow out of the work space respectively out of the housing.

To provide a higher resistance with respect to a thrust force, the closure body 1 comprises on its inner face in the passage 1.1 a circumferential notch 6 which forms an indentation with the melting element 3. Moreover, the closure core 2 comprises on its outer periphery, which is substantially spherical respectively globular, a bottleneck 5 which is also filled with the melting element 3. These measures enable to form a particularly intimate connection between closure body 1, melting element 3 and closure core 2.

According to the invention, the closure core 2 is provided with a blind bore 4, so that the working medium may flow into the closure core 2 and fills up a relatively large surface of the closure core 2, on the inner face thereof. Hereby, the closure core 2 is particularly quickly superheated when the working medium reaches an excessive temperature, wherein the heat is again transmitted from the closure core 2 to the melting element 3 and fuses the latter.

In the illustrated embodiment, the melting element 3 ends up flush with the closure body 1 and in particular with the closure core 2 on the axial inner end respectively front end of the closure body 1. The closure core 2 protrudes more or less over the melting element 3 in axial direction on the axially opposite end.

The invention claimed is:

1. A hydrodynamic machine fitted with a rotating primary wheel and a rotating or stationary secondary wheel, wherein the drive power or torque is transmitted hydrodynamically from the primary wheel to the secondary wheel by means of a working medium, comprising a closure with thermal safety function inserted in a housing of the hydrodynamic machine that contains a working medium, wherein:

the closure includes a closure body for at least one of screwing, inserting into and mounting on the housing;

the closure body includes a passage, comprising a closure core, connected to the closure body by means of a melting element that can be melted at a predefined temperature, the closure core directly connected to at least one of the closure body and an intermediate element introduced in a seal-forming fashion in the closure body in such a way that the passage is sealed off to prevent the working medium from passing through;

the closure core includes at least one of a blind bore and a blind hole, that is open to the working space, so that the working medium can flow into the closure core.

2. The hydrodynamic machine according to claim 1, wherein the closure core consists of a massive cast material, that comprises at least one of the blind bore and the blind hole by shape cutting.

3. The hydrodynamic machine according to claim 1, wherein the closure core comprises a spherical form on its outer face.

4. The hydrodynamic machine according to claim 2, wherein the closure core comprises a spherical form on its outer face.

5. The hydrodynamic machine according to claim 1, wherein the closure core includes a bottleneck filled with the melting element on its outer face.

6. The hydrodynamic machine according to claim 2, wherein the closure core includes a bottleneck filled with the melting element on its outer face.

7. The hydrodynamic machine according to claim 3, wherein the closure core includes a bottleneck filled with the melting element on its outer face.

8. The hydrodynamic machine according to claim 4, wherein the closure core includes a bottleneck filled with the melting element on its outer face.

9. The hydrodynamic machine according to claim 1, wherein the melting element comprises a circular ring shape having a through-hole, where the closure core is inserted in a seal-forming fashion.

10. The hydrodynamic machine according to claim 2, wherein the melting element comprises a circular ring shape having a through-hole, where the closure core is inserted in a seal-forming fashion.

11. The hydrodynamic machine according to claim 3, wherein the melting element comprises a circular ring shape having a through-hole, where the closure core is inserted in a seal-forming fashion.

12. The hydrodynamic machine according to claim 4, wherein the melting element comprises a circular ring shape having a through-hole, where the closure core is inserted in a seal-forming fashion.

13. The hydrodynamic machine according to claim 5, wherein the melting element comprises a circular ring shape having a through-hole, where the closure core is inserted in a seal-forming fashion.

14. The hydrodynamic machine according to claim 6, wherein the melting element comprises a circular ring shape having a through-hole, where the closure core is inserted in a seal-forming fashion.

15. The hydrodynamic machine according to claim 7, wherein the melting element comprises a circular ring shape having a through-hole, where the closure core is inserted in a seal-forming fashion.

16. The hydrodynamic machine according to claim 8, wherein the melting element comprises a circular ring shape having a through-hole, where the closure core is inserted in a seal-forming fashion.

17. The hydrodynamic machine according to claim 1 wherein the closure body comprises a recess, in a form of a circumferential notch, the recess widens the passage and is filled with the melting element, the recess being arranged at a distance from both axial ends of the passage.

18. The hydrodynamic machine according to claim 2 wherein the closure body comprises a recess, in a form of a circumferential notch, the recess widens the passage and is filled with the melting element, the recess being arranged at a distance from both axial ends of the passage.

19. The hydrodynamic machine according to claim 1, wherein an outer diameter of the closure core is reduced in relation to an inner diameter of the passage in such a way that jamming of the closure core in the passage is prevented.

20. The hydrodynamic machine according to claim 2, wherein an outer diameter of the closure core is reduced in relation to an inner diameter of the passage in such a way that jamming of the closure core in the passage is prevented.

* * * * *